UNITED STATES PATENT OFFICE.

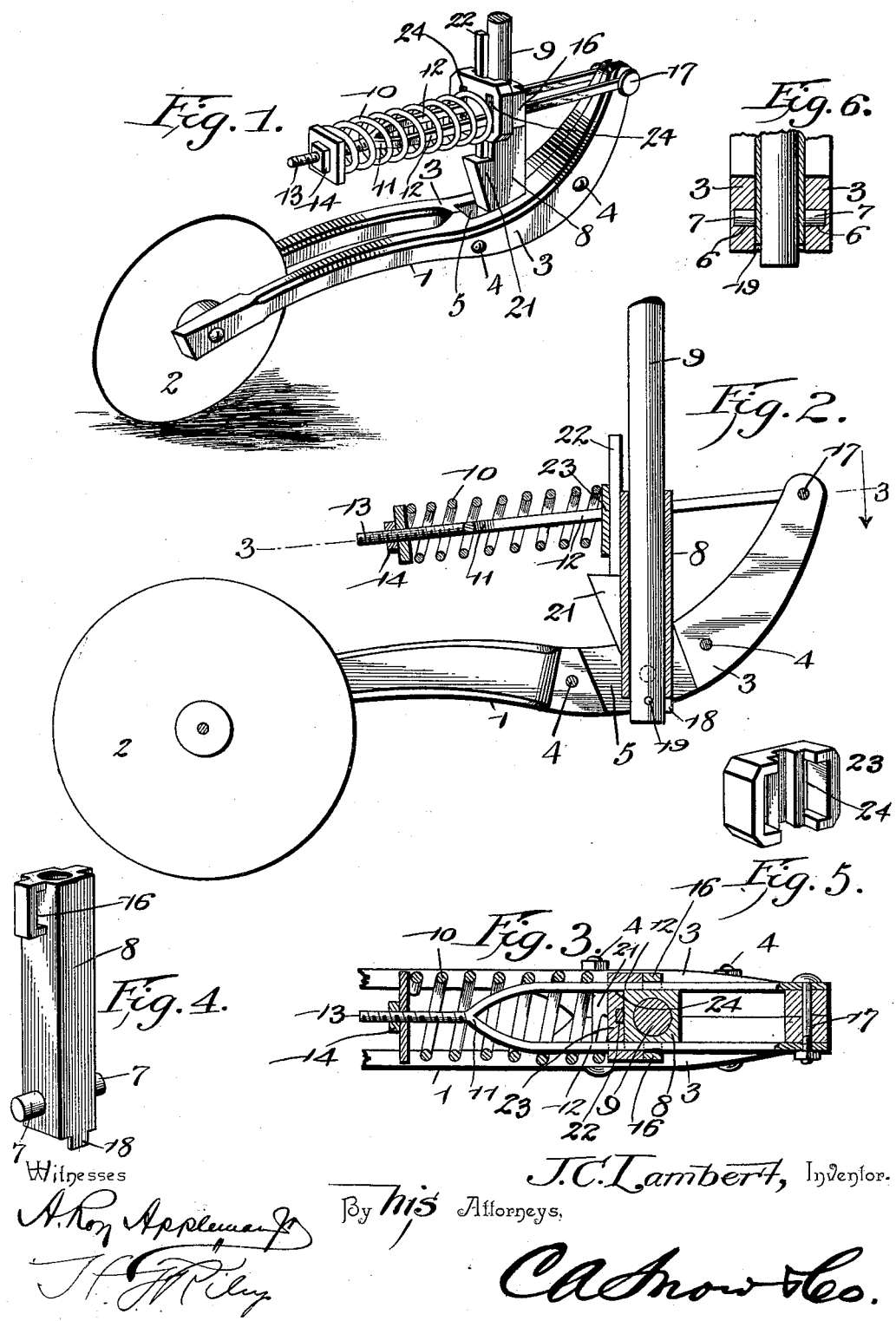

JOHN CALVIN LAMBERT, OF TONICA, ILLINOIS.

AUTOMATIC ROLLING CUTTER FOR PLOWS.

SPECIFICATION forming part of Letters Patent No. 636,342, dated November 7, 1899.

Application filed May 3, 1899. Serial No. 715,412. (No model.)

*To all whom it may concern:*

Be it known that I, JOHN CALVIN LAMBERT, a citizen of the United States, residing at Tonica, in the county of La Salle and State of Illinois, have invented a new and useful Automatic Rolling Cutter for Plows, of which the following is a specification.

The invention relates to improvements in automatic rolling cutters for plows.

The object of the present invention is to improve the construction of cutters or colters for plows and to provide a simple and comparatively inexpensive one designed especially for sulky or gang plows and capable of yielding to a hard substance or obstruction and of passing over the same.

A further object of the invention is to provide a device of this character which will be arranged so that it will not collect weeds and straw and clog the plow.

Another object of the invention is to obviate the necessity of adjusting the cutter to enable it to pass over a hard substance and to reduce the draft of the plow to a minimum, and also to provide means whereby when it is desired the cutter may be locked rigid with the plow.

The invention consists in the construction and novel combination and arrangement of parts hereinafter fully described, illustrated in the accompanying drawings, and pointed out in the claims hereto appended.

In the drawings, Figure 1 is a perspective view of a rolling or rotary cutter constructed in accordance with this invention. Fig. 2 is a longitudinal sectional view. Fig. 3 is a sectional view on line 3 3 of Fig. 2. Fig. 4 is a detail perspective view of the pivotally-mounted socket. Fig. 5 is a detail perspective view of the guide-block. Fig. 6 is a detail sectional view illustrating the manner of mounting the pivoted socket.

Like numerals of reference designate corresponding parts in all the figures of the drawings.

1 designates a standard having its rear portion bifurcated or forked to receive a rotary or rolling cutter 2, and preferably composed of two sections 3, connected by transverse bolts 4 or other suitable fastening devices; but it will be readily apparent that the standard may be constructed of a single piece of material, if desired. The front portion of the standard is curved upward and presents an inclined front edge, so that the device will not collect weeds and straw and clog a plow. The cutter, which is located in the bifurcation, is mounted on a suitable pivot or axle; but any desired form of journals and bearings may be provided, if desired. At a point between its ends the standard is provided with an opening 5, and it has bearing-sockets 6, located at opposite sides of the opening 5 and receiving pivots or trunnions 7, of a socket 8 for a pivot 9, which is mounted on a plow-beam in a suitable opening or socket thereof, whereby the device is pivotally connected with the same. The opening 5 is of sufficient size to permit the standard to have a limited pivotal movement on the socket 8, so that the cutter 2 may rise and pass over an obstruction to avoid being broken or otherwise injured, and the cutter is normally held down to its work by a coiled spring 10, which is connected with the upper end of the standard and with the socket.

The coiled spring is disposed on a connecting piece or frame 11, of substantially Y shape, provided with parallel side portions 12, and having a shank 13, which is threaded to receive an adjusting-nut 14, a washer being interposed between the nut and the rear end of the spring, which is located in rear of the socket 8. The sides 12, which are parallel, extend through loops 16 and are pivoted by a bolt 17 or other suitable fastening device to the upper end of the standard, and they receive the socket 8 between them. The loops 16 consist of slots or openings formed in lugs which are located at the top of the socket 8 at opposite sides thereof. The lower end of the socket is provided at its front side with a depending lug or projection 18, which is arranged to engage a transverse key or pin 19, whereby the device is prevented from turning entirely around the pivot. By adjusting the tension of the spring the depth of the cutter may be regulated, and when it strikes a hard substance or an obstruction it will rise and pass over the same without being injured, the spring being compressed by such upward movement of the cutter. This operation obviates the necessity of changing the depth of the cutter when the plow arrives at a hard or stony piece of ground.

The device may be locked rigid with the beam of a plow by a wedge-shaped locking device 21, located in rear of the socket 8 and adapted to be interposed between the same and the rear wall of the opening 5, which is flared upwardly. The locking device 21 is provided with a stem or shank 22, which passes upward through a groove or opening of a guide-block 23, and which is designed to be connected with any suitable operating mechanism whereby the operator may allow the locking device to drop into engagement with the socket and the standard when desired. The operating mechanism is designed to hold the locking device normally out of engagement with the standard and the socket 8, and the guide-block, which is interposed between the front end of the spring and the socket 8, is provided at its inner face with a recess for the reception of the same, and it has slots 24 at opposite sides for the sides of the connecting piece or frame.

The invention has the following advantages: The automatically-operating rolling cutter or colter is pivotally and yieldingly mounted on the beam of a plow, and it is adapted should it strike a hard substance or obstruction to rise and pass over the same, whereby it is prevented from being broken or otherwise injured. By this operation the draft of a plow is materially lessened and it is unnecessary to adjust the cutter or colter to suit the ground in different portions of a field. The device is strong and durable and any of the parts may be replaced at a small cost should they become broken. The sliding locking device, which is adapted to hold the parts rigid with a plow-beam, is retained in engagement with the standard and the socket by gravity. The pivotal movement of the device on a plow is limited by the depending lug at the lower end of the socket to prevent the cutter-wheel from swinging around to a point in advance of the pivot. Also the inclination of the standard is adapted to prevent the device from becoming clogged by weeds, straw, and the like, and interfering with the operation of the plow.

Changes in the form, proportion, size, and the minor details of construction within the scope of the appended claims may be resorted to without departing from the spirit or sacrificing any of the advantages of this invention.

What is claimed is—

1. A device of the class described comprising a standard, a pivot designed to be mounted on a plow-beam and having the standard fulcrumed on it, a cutter, and means for cushioning the standard, substantially as described.

2. A device of the class described comprising a vertical pivot, a standard fulcrumed between its ends on the pivot, a cutter, and a spring connected with the standard and with the pivot, substantially as described.

3. A device of the class described comprising a standard having its front portion arranged at an inclination, a cutter-wheel mounted on the rear portion of the standard, and means for fulcruming the standard and for cushioning the same, substantially as described.

4. A device of the class described comprising a vertical pivot, a standard fulcrumed between its ends on the pivot and carrying a cutter, a connecting piece or frame extending rearward from the front of the standard, and a spring located in rear of the pivot and interposed between the same and a stop of the connecting piece or frame, substantially as described.

5. A device of the class described comprising a vertical pivot, a standard fulcrumed between its ends on the same, a connecting-piece having sides straddling the pivot and connected with the front of the standard, a spring disposed on the rear portion of the connecting-piece, and an adjusting device mounted on the connecting-piece and engaging the spring substantially as described.

6. A device of the class described comprising a vertical pivot, a standard fulcrumed on the pivot and carrying a cutter, and a locking device arranged to hold the standard rigid with the pivot, whereby the cutter is prevented from moving upward and downward, substantially as described.

7. A device of the class described comprising a standard, a socket having the standard fulcrumed on it, a pivot arranged in the socket and designed to be mounted on a plow-beam, and a cushioning device connected with the socket and with the standard, substantially as described.

8. A device of the class described comprising a pivotally-mounted standard arranged to swing upward and downward and carrying a cutter, a tension device for yieldingly holding the cutter downward and adapted to permit the same to swing upward to pass over an obstruction, and a locking device for holding the standard rigidly at the lower limit of its movement, substantially as described.

9. A device of the class described comprising a vertical piece 8 provided at opposite sides with openings, a standard fulcrumed between its ends on the vertical piece 8, a connecting-frame extending through the said openings and pivoted to the standard, a spring disposed on the connecting-frame, and a cutter, substantially as described.

10. A device of the class described comprising a standard, the piece 8 having the standard fulcrumed on it, a guide-block arranged on the piece 8, a spring cushioning the standard and engaging the guide-block, and a locking device guided by the said block and arranged to engage the standard and the piece 8, substantially as described.

11. A device of the class described comprising a standard provided between its ends with an opening, the piece 8 arranged in the opening of the standard and having the latter fulcrumed on it, a cushioning device, and the movable locking device arranged to extend into the opening of the standard, whereby the latter is held rigid with the piece 8, substantially as described.

12. A device of the class described comprising a standard provided between its ends with an opening, a socket arranged within the opening and pivotally connected with the standard, said socket being provided at its upper portion with openings, a connecting-frame extending rearward from the standard and having sides passing through the said openings of the socket, a guide-block having openings to receive the sides of the connecting-frame and arranged contiguous to the socket, a spring engaging the guide-block, and a locking device having a stem or portion guided by the said block, said locking device being adapted to extend into the opening of the standard, substantially as and for the purpose described.

In testimony that I claim the foregoing as my own I have hereto affixed my signature in the presence of two witnesses.

JOHN CALVIN LAMBERT.

Witnesses:
G. D. HILTABRAND,
J. E. HARTENBOWER.